(12) United States Patent
Golovkin et al.

(10) Patent No.: US 10,095,865 B2
(45) Date of Patent: *Oct. 9, 2018

(54) DETECTING UNAUTHORIZED REMOTE ADMINISTRATION USING DEPENDENCY RULES

(71) Applicant: AO Kaspersky Lab, Moscow (RU)

(72) Inventors: Maxim Y. Golovkin, Moscow (RU); Alexey M. Romanenko, Moscow (RU); Alexey V. Monastyrsky, Moscow (RU)

(73) Assignee: AO KASPERSKY LAB, Moscow (RU)

(*) Notice: Subject to any disclaimer, the term of this patent is extended or adjusted under 35 U.S.C. 154(b) by 0 days.

This patent is subject to a terminal disclaimer.

(21) Appl. No.: 15/784,710

(22) Filed: Oct. 16, 2017

(65) Prior Publication Data

US 2018/0052996 A1  Feb. 22, 2018

Related U.S. Application Data

(63) Continuation of application No. 15/386,423, filed on Dec. 21, 2016, now Pat. No. 9,811,661.

(30) Foreign Application Priority Data

Jun. 24, 2016 (RU) .................. 2016125280

(51) Int. Cl.
*G06F 21/55* (2013.01)
*G06F 21/56* (2013.01)

(52) U.S. Cl.
CPC .......... *G06F 21/554* (2013.01); *G06F 21/562* (2013.01); *G06F 21/566* (2013.01); *G06F 21/568* (2013.01); *G06F 2221/034* (2013.01)

(58) Field of Classification Search
CPC .................................................... G06F 21/554
See application file for complete search history.

(56) References Cited

U.S. PATENT DOCUMENTS 8,990,944 B1*  3/2015  Singh .................. G06F 21/56
                                                  726/24
2003/0204746 A1* 10/2003  Cromer .............. G06F 21/575
                                                  726/34

(Continued)

FOREIGN PATENT DOCUMENTS

JP       2007280013 A      10/2007
JP       2011053893 A       3/2011

*Primary Examiner* — William S Powers
(74) *Attorney, Agent, or Firm* — Arent Fox LLP; Michael Fainberg (57) ABSTRACT

Disclosed are a system and method for protecting computers from unauthorized remote administration. One exemplary method includes: intercepting events occurring in the computer system including a first event and a second event associated with data transfer with an application executing in the computer system; determining that the first intercepted event is dependent on the second intercepted event based on parameters of the first intercepted event and the second intercepted event; generating a rule defining a dependency of at least one parameter of the first intercepted event on at least one parameter of the second intercepted event; responsive to determining a degree of similarity of the generated rule and a previously created rule exceeds a threshold value, identifying at least one application as a remote administration application that created the first and second identified intercepted events; and blocking the identified remote administration application from exchanging data with the computer system.

18 Claims, 3 Drawing Sheets

(56) References Cited

U.S. PATENT DOCUMENTS

| | | |
|---|---|---|
| 2009/0089040 A1 | 4/2009 | Monastyrsky |
| 2009/0288167 A1* | 11/2009 | Freericks ................ G06F 21/54 |
| | | 726/23 |
| 2010/0050260 A1* | 2/2010 | Nakakoji ............ H04L 63/0227 |
| | | 726/23 |
| 2011/0030057 A1* | 2/2011 | Chen ................... H04L 63/1416 |
| | | 726/23 |
| 2011/0185418 A1 | 7/2011 | Boteler et al. |
| 2014/0096184 A1 | 4/2014 | Zaitsev |
| 2015/0205962 A1 | 7/2015 | Swidowski et al. |
| 2016/0156642 A1 | 6/2016 | Kouznetsov |

* cited by examiner

Fig. 3

DETECTING UNAUTHORIZED REMOTE ADMINISTRATION USING DEPENDENCY RULES

CROSS-REFERENCE TO RELATED APPLICATIONS

This application is a continuation of prior U.S. patent application Ser. No. 15/386,423, filed Dec. 21, 2016, which claims benefit of priority under 35 U.S.C. 119(a)-(d) to a Russian Patent Application No. 2016125280 filed on Jun. 24, 2016, both of which are incorporated by reference herein.

FIELD OF TECHNOLOGY

The present disclosure relates generally to the field of cybersecurity, and more specifically to systems and methods for protecting computers from unauthorized remote administration.

BACKGROUND

The rapid development in the past decade of computer technologies, and also the widespread use of diverse computing devices (personal computers, notebooks, tablets, smartphones, etc.), has served as a powerful stimulus for the use of these devices in every possible sphere of human activity and for a tremendous number of tasks (from Internet surfing to bank transfers and electronic document traffic). In parallel with the growth in numbers of computing devices and software running on these devices, the volume of malicious software has also grown at a rapid pace.

At present, a huge number of malicious program varieties exist, corresponding to various classes of malicious programs. Some of them steal personal and confidential data from the devices of users (such as logins and passwords, bank details, electronic documents). Others form so-called botnets from the devices of users to guess passwords using the brute force method or launch attacks such as a denial of service (Distributed Denial of Service, DDOS) against other computers or computer networks. Still others foist paid content onto users through aggressive advertising, paid subscriptions, sending of text messages to paid phone numbers, and so forth.

For example, one group of malicious programs may perform a remote administration over infected computers of users. After such a program is installed on the user's computer, it may often obtain administrator rights, which may allow it access to any confidential information of the user, and also let it perform any actions on the user's computer and transfer information about the results of its working to hackers through the computer network. For example, one of the varieties of the above-described program may duplicate on a victim's computer the actions of the hacker being performed by him on his own computer.

The complexity of detecting the above-described programs may be due to the fact that oftentimes they: do not perform malicious actions in explicit form (for example, they do not destroy data, but instead organize DDOS attacks and so forth); they carry out active operations episodically and irregularly; they present themselves as legitimate applications which may be used by administrators to control client computers.

Thus, present-day antivirus programs may not see a malicious functionality in the actions of the above-described programs. Also, known antivirus programs may not handle the tasks of detecting: applications with previously unknown behavior for carrying out a remote administration; or groups of applications realizing a remote administration only taken together, each application having its own perfectly legitimate functionality; and the above-described approaches may also produce false alarms in detecting malicious programs when the remote administration is being performed with the permission of the user.

The present invention solves the problem of protecting computers from unauthorized remote administration.

SUMMARY

Disclosed are system and method for protecting computers from unauthorized remote administration. In accordance with one exemplary aspect, a method of detecting a remote administration of a computer system is provided. The method includes intercepting a plurality of events occurring in the computer system including a first event and a second event associated with data transfer with an application executing in the computer system, determining that the first intercepted event is dependent on the second intercepted event based on parameters of the first intercepted event and the second intercepted event, and generating a rule defining a dependency of at least one parameter of the first intercepted event on at least one parameter of the second intercepted event. The method further includes, responsive to determining a degree of similarity of the generated rule and a previously created rule exceeds a threshold value, identifying at least one application as a remote administration application that created the first and second identified intercepted events, and blocking the identified remote administration application from exchanging data with the computer system.

In another exemplary aspect, the method further includes determining respective parameters of each of the plurality of intercepted events, and identifying, based at least on the determined parameters, each intercepted event as being relating to a first data transfer by an application in a computer network or a second data transfer to the application from a peripheral data input device of the computer system.

In another exemplary aspect, the dependency is determined further based on a time elapsed between the interception of the first event and the interception of the second event and a pre-determined time threshold.

In another exemplary aspect, determining the degree of similarity of the generated rule and a previously created rule further includes: comparing the generated rule to the previously created rule that defines one or more dependencies of parameters of events occurring in the computer system during the remote administration.

In another exemplary aspect, the rule defining the dependency specifies a rectangular transform matrix as a function of a set of parameters of the first event and a set of parameters of the second event.

In another exemplary aspect, the generated rule is formulated in matrix form, wherein the dependency of the at least one parameter of the first event on the at least one parameter of the second event is expressed through operations with a matrix.

In another exemplary aspect, the generated rule is formulated in vector form, wherein the dependency of the at least one parameter of the first event on the at least one parameter of the second event is expressed through operations with a set of coefficients.

In accordance with another exemplary aspect, a system for detecting a remote administration of a computer system includes a hardware processor configured to intercept a plurality of events occurring in the computer system including a first event and a second event associated with data transfer with an application executing in the computer system. The processor is further configured to determine that the first intercepted event is dependent on the second intercepted event based on parameters of the first intercepted event and the second intercepted event, generate a rule defining a dependency of at least one parameter of the first intercepted event on at least one parameter of the second intercepted event, responsive to determining a degree of similarity of the generated rule and a previously created rule exceeds a threshold value, identify at least one application as a remote administration application that created the first and second identified intercepted events, and block the identified remote administration application from exchanging data with the computer system.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

DETAILED DESCRIPTION

A number of terms and definitions will be used in describing various aspects of the invention. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

An event of a computer system may refer to a group of actions performed by an application in the computer system.

A parameter of an event of a computer system may include a group of various attributes of the event of the computer system.

Figure 1:
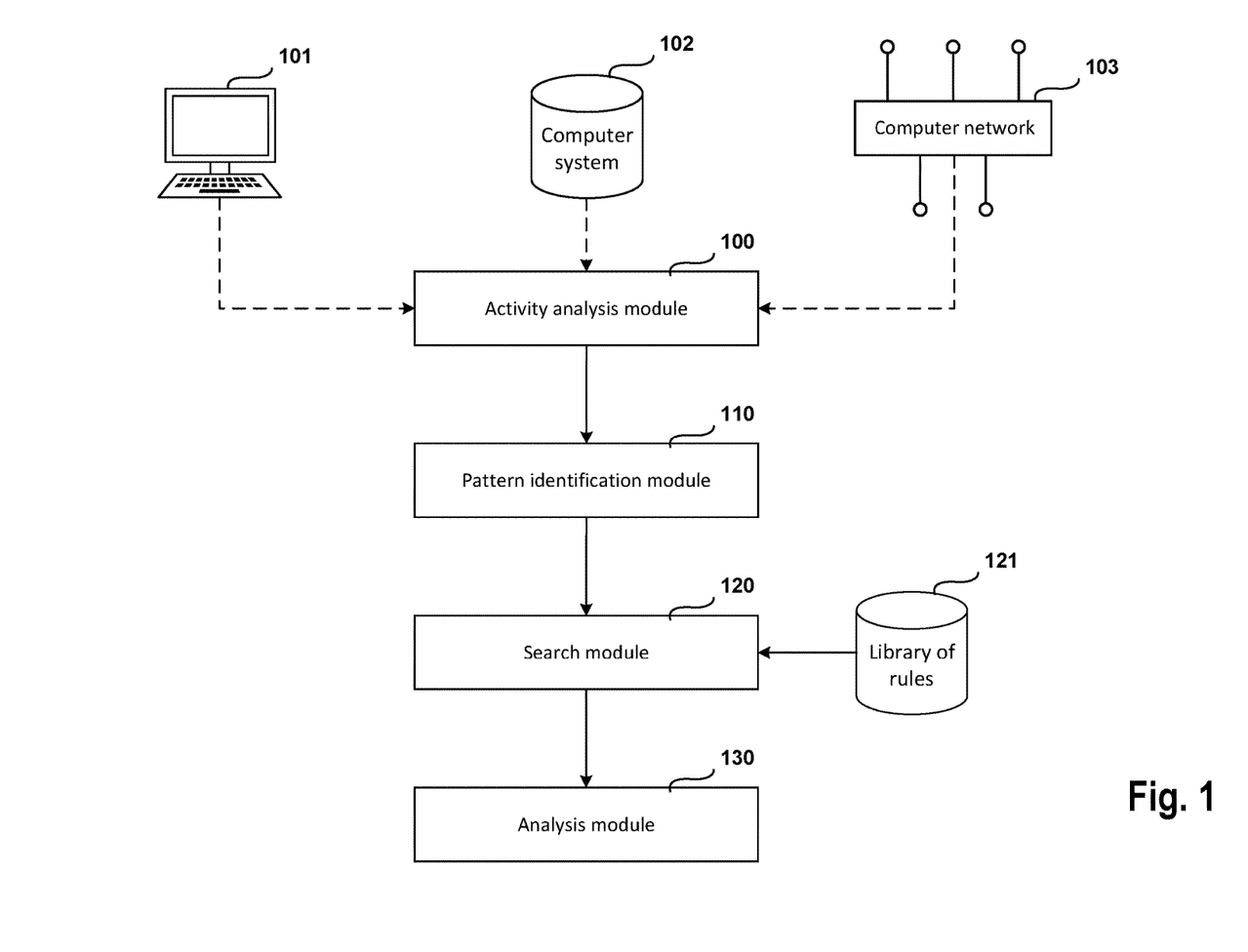
FIG. 1 presents a structural diagram of an exemplary system for protecting computers from unauthorized remote administration.

FIG. 1 presents a structural diagram an exemplary system for protecting computers from unauthorized remote administration. The system includes an activity analysis module 100, a peripheral data input device 101, a computer system 102, a computer network 103, a pattern identification module 110, a search module 120, a library of rules 121, and an analysis module 130.

The activity analysis module 100 may be configured to:
intercept events occurring in the computer system 102, where the events intercepted may include at least one of the following:
a call by applications for API functions of an operating system installed on the computer system 102;
a transfer of data between processes of applications with the use of the Inter-Process Communication technology;
a transfer of data between software and hardware components of the computer system 102;
a transfer of data by applications in the computer network 103;
a transfer of data to applications from the peripheral data input device s 101;
determine the parameters of each intercepted event; and
send the determined parameters of the intercepted events to the pattern identification module 110.

The intercepting of events may be performed via a driver installed in the computer system 102.

For example, application programming interface (API) functions of the operating system being called up by the applications may include one or more following API functions for working:
with files, such as CreateFile, ReadFile, WriteFile and so forth;
with the computer network, such as socket, connect, recv, send and so forth;
with processes, such as ReadProcessMemory, WriteProcessMemory and so forth;
with Windows events, such as PostMessage, SendMessage and so forth;

For example, the hardware component of the computer system 102 may include at least one of the following:
external information media, such as optical drives like the CD-RW drive, the DWD-RW drive or the BD-RE drive;
a graphics adapter; and
a game controller.

The peripheral data input device 101 may include at least one of the following:
a keyboard;
a computer mouse;
a touchscreen; and
a contactless touchscreen controller.

For example, the data being transferred to the applications from the peripheral data input device s 101 may include at least one of the following:
text being entered from the keyboard;
the coordinates of cursor movement executed via a computer mouse or the touchscreen; and
the images being received by the contactless touchscreen controller.

The event parameters may include at least one of the following:
the type of event;
the identifier of the application or process which created the event (Process Identifier, PID) in the operating system,
the identifier of the application or service which created the event (Globally Unique Identifier, GUID) in the operating system;

the event preceding the mentioned event;
for the data being transferred:
  the unique identifiers of the source of the data transmission and the source of the data reception, which may include at least one of the following:
  the network address of the server taking part in the data transmission in the computer network 103,
  the type of hardware component of the computer system 102,
  the type of data being transferred;
  the volume of data being transferred;
  the data being directly transferred.

For example, the type of event may be a numerical value, where 0x00 corresponds to an unknown type of event, 0x01 means calls by applications of API functions of the operating system, 0x02 means transfer of data between processes of applications, 0x03 means transfer of data to applications from peripheral data input device s 101 and so forth.

The type of event may be determined based at least on which of the drivers installed in the computer system 102 intercepted the event. For example, if the event was intercepted by the keyboard driver, that event may be assigned to a transfer of data to applications from peripheral data input device s 101, and accordingly the type of event intercepted may be equal to 0x03; if the event was intercepted by the driver of a network device designed to transfer data in the computer network 103, that event may be assigned to a transfer of data by applications in the computer network 103, and accordingly the type of event intercepted may be equal to 0x04 and so forth. Thus, same events of the computer system 102 may be intercepted by different drivers and, consequently, there may include several types of events at the same time. For example, the event of transfer of data from application to application with the help of IPC can be an event of calling by applications for API functions of the operating system (ReadProcessMemory, WriteProcessMemory) having event type 0x01, and also an event of transfer of data between processes of applications using the interprocess communication technology having event type 0x02.

For example, certain events may follow each other:
  transfer to the application Microsoft Lync of text from keyboard 101 (event #1) and subsequent transfer of the same text by local area computer network 103 (event #2);
  calling by the application RemoteAdmin of the function recv (event #1) and calling by the application RemoteAdmin of the function WriteProcessMemory (event #2).

For example, the data being transferred may include at least one of the following type:
  media data, such as video clips or audio recordings;
  images;
  components of Internet pages, such as the html code of the page, css style sheets, and so forth;
  data libraries;
  archived data; and
  nonstructured data, such as row data obtained from peripheral data input device s 101.

The parameters of the intercepted event, including the type of data transferred, may be determined by the driver which intercepted that event. Drivers designed to intercept different events may determine different types of events for identical data. For example, the user enters text, by means of the keyboard 101, comprising a JavaScript code into the field of the word processor Notepad++. The keyboard driver may intercept the event of data transfer from the keyboard 101 to the process of the application Notepad++ and interpret the transferred data as unformatted text, i.e., as a certain set of characters. As a result, the driver of API function calls may intercept the data written at a certain virtual address of the process of the application Notepad++ and interpret it as being properly formatted html code of an Internet webpage, i.e., as a set of tags with specified parameters.

The pattern identification module 110 may be configured to:
  identify among the events intercepted at least one event of data transfer by an application in the computer network 103, and the event which has occurred of data transfer to the application from the peripheral data input device 101, based at least on an analysis of the received parameters of the intercepted events;
  determine among the intercepted events at least one event dependent on the events identified, the dependence of the intercepted event on the identified event being determined at least by at least one of the following:
    the time elapsed between the registering of the identified event and the subsequent registering of the intercepted event may be less than a previously established time threshold,
    the parameters of the intercepted event may correlate with the parameters of the identified event registered earlier than the mentioned intercepted event;
  form for at least one determined event a rule which describes the dependency of the parameters of the determined event on the parameters of the identified events;
  and send the formulated rule together with information on the determined event to the search means 120;

The identifying of the event among the intercepted events may occur based on at least one of the following:
  the type of event; and
  the unique identifier of the application or the process of the application having created the event.

For example, 5 events may be intercepted: (1) a call by the application RemoteAdmin of the API function recv, (2) a call by the application Lync of the API function send, (3) a transfer of text data from the application RemoteAdmin to the application Lync, (4) a transfer of text data from the keyboard 101 to the application Lync and (5) a transfer of text data from the application RemoteAdmin to a remote server in the computer network 103. Among the intercepted events, the events may be identified which are related to the peripheral data input device s 101 and to the transfer of data in the computer network 103, namely, (4) transfer of text data from the keyboard 101 to the application Lync, and (5) transfer of text data from the application RemoteAdmin to a remote server in the computer network 103. Using the identified events (4) and (5), the event of a call by the application Lync of the API function send (3) may be determined, whose parameters of data transfer in the computer network 103, where the transfer may occur by the calling of the API function send, such as the type of data transferred (text) and the network address of the server onto which the data transfer occurs, are dependent on the change in parameters of the event (4), such as the data type (text), and the event (5), such as an Internet Protocol (IP) address of the server onto which the data transfer may occur in the computer network 103.

The rule describing the dependency of the parameters of one event on the parameters of another event may include at least:
  the rectangular transform matrix $T=(t_{i,j})_{i=1,j=1}^{m,n}$, such that $$P_2 = T \times P_1,$$

where
P$_1$=(p$_i$)$_{i=1}^m$—is the set of parameters of event #1
P$_2$=(p$_j$)$_{j=1}^n$—is the set of parameters of event #2
the set of coefficients {a$_1$} of the function P$_2$= $f$(a$_1$, a$_2$, ..., a$_n$, P$_1$),
where
P$_1$—are the parameters of event #1,
P$_2$—are the parameters of event #2.

The formulation of the rule describing the dependency of the parameters of one event on the parameters of another event may include at least one of the following:
selecting at least one of the ways of representing the rule being formulated:
in matrix form, where the dependency of one parameter on another may be expressed through operations with a matrix,
in vector form, where the dependency of one parameter on another may be expressed through operations with a set of coefficients;
calculating the coefficients to be used for the selected representation of the rule for the specified parameters of the event.

The search module 120 may be configured to:
determine the degree of similarity of the obtained rule with at least one previously created rule from the library of rules 121 based at least on a comparison of the mentioned rules, wherein the previously created rule may define the dependency of the parameters of events occurring in the computer system 102 during the remote administration;
if the degree of similarity previously determined exceeds an established threshold value, determine at least one application having created the event intercepted by the activity analysis module 100 whose parameters, as determined, may be used by the pattern identification module 110 to formulate the obtained rule, whose determined degree of similarity with at least one previously created rule may be higher than the established threshold value; and
send the information identifying the at least one determined application to the analysis module 130;

The previously created rules may be selected from the library of rules 121 based on coefficients of the rule obtained from the pattern identification module 110.

The previously created rules may be created in the same way as the rule formulated by the pattern identification module 110, namely:
a) various events may be intercepted in a computer system in which a known remote administration application was previously installed;
b) the parameters of the events may be determined for the intercepted events;
c) based on an analysis of the parameters as determined in the previous step for the events intercepted in step a), events of data transfer by the mentioned remote administration application in the computer network and events of data transfer to the mentioned remote administration application from a peripheral data input device may be identified among the mentioned events;
d) among the events determined in step a), at least one event may be determined which may be dependent on the events identified in the previous step;
e) a rule may be created for at least one event determined in the previous step which described the dependency of the parameters of the event determined in the previous step on the parameters of the events identified in step c);

The comparison of the rules may involve at least a comparison of the established threshold value with:
a value representing the result of the convolution of functions describing the rules being compared:

$$g=f_1 * f_2,$$

where
$f_1$—is a function mathematically expressing rule #1,
$f_2$—is a function mathematically expressing rule #2;
since a rule may include a predetermined relation between input and output data, where the predetermination (determinativeness) means that the relation is unambiguously defined, i.e., no ambiguity or indeterminativeness may be allowed, therefore the rule may be mathematically expressed by a certain function $f$ relating the input and output data of the rule;
a value comprising the result of a convolution of sequences constituting a set of elements of matrices describing the rules being compared:

$$g=\{a_k\}*\{b_l\},$$

where
{a$_k$}—is the set of elements of the matrix A= (a$_{i,j}$)$_{i=1,j=1}^{m,n}$, mathematically expressing rule #1,
{b$_l$}—is the set of elements of the matrix B= (b$_{i,j}$)$_{i=1,j=1}^{m,n}$, mathematically expressing rule #2;
since a rule may include a predetermined relation between input and output data, the rule may be mathematically expressed by a certain matrix A transforming input data into output data of the rule;

The degree of similarity may comprise a number determined at least as:
the scalar product of two vectors, where each vector is a set of coefficients of the rules being compared; and
the value of the parameters of the previously determined convolution.

For example, in the case when rule #1 is described by 3 coefficients:
a$_1$=0.10, a$_2$=0.3, a$_3$=0.17
and rule #2 is described by 3 coefficients:
b$_1$=0.5, b$_2$=0.9, b$_3$=0.21
characterizing a function of the change in volume of the data transmitted in the computer network 103 in relation to the volume of data received in the computer network 103:

$$y=p_1 \times x^2 + p_2 \times x + p_3.$$

where
y—is the volume of the data transmitted in the computer network 103,
x—is the volume of the data received in the computer network 103,
{p}—is the set of coefficients
the degree of similarity of the rules #1 and #2 may be calculated as:

$$w=a_1 \times b_1 + a_2 \times b_2 + a_3 \times b_3$$

which may give in the above-described case w=0.0434. In the case when w=0.0 the rules may be identical, in the case when w=1.0, the rules may be different. As the criterion of similarity of the rules one uses the established threshold value w$_{threshold}$=0.1. Accordingly, the above compared rules #1 and #2 may be similar.

The information identifying at least one application determined by the search module 120 may include at least one of the following:
the unique identifier of the application or the process created by the application;

the path to the executable application file; and the name of the application.

The analysis module 130 may be configured to:

analyze the application identified from the information received, where the dependency of the parameters of the event of the data transfer by the mentioned application in the computer network 103 on the parameters of the event of the data transfer from the peripheral data input device 101 may be determined during the analysis;

pronounce a verdict on the detecting of a remote administration application based at least on a determination of the existence of a dependency during the analysis;

block the aforementioned application based on the results of the verdict pronounced as to the detecting of a remote administration application.

The analysis of the application may include at least one of the following:

a heuristic analysis of the application, during which one may determine:

which data may be transferred from the peripheral data input device 101;

which actions may occur after the data transfer in the computer system 102, which data after this is transmitted or received in the computer network 103, the dependency between the determined data and actions;

an analysis of the structure of the application and of the search for code responsible for:

transfer of data in the computer network 103, performance of actions in the computer system 102, transmission or reception of data in the computer network 103.

For example, in analyzing the structure of the application, one may search for executable code which may be responsible for:

transmission or reception of data in the computer network 103, performance of actions in the computer system 102;

yet not related to:

receiving of data from peripheral data input device s 101;

and which may be defined by the pseudocode:

```
recv(<server>, <command>)
switch(<command>)
case <action-id>: <action>
...
case <action-id>: <action>
```

Such an organization of the working of an application may be characteristic of remote administration applications which exchange data with servers in a computer network 103, perform actions in a computer system 102, yet do not in any way process data being received from peripheral data input device s 101.

The blocking of the application may involve at least one of the following:

blocking the exchange of data in the computer network with the involvement of the application;

removal of the application from the RAM;

removal of the application from information media (such as hard drives and the like) which may comprise the computer system 102.

For example, if the application RemoteAdmin may be determined to be a remote administration application, the analysis module 130 may set up (e.g., assigning the corresponding operating parameters) a firewall so that no network packets may be transmitted from RemoteAdmin to servers of the computer network 103 and from servers to the RemoteAdmin application. Thus, the RemoteAdmin application may function in the computer system 102, but may not receive commands or transmit data in the computer network 103, which may indicate that the application is a safe application.

In accordance with aspects of the invention, it may be contemplated a system for blocking of remote administration including a computer system 102 in which two remote administration applications may be installed—at least a legitimate application RemoteAdmin and a malicious application Backdoor.Win32.Agent. The application RemoteAdmin may be intended for remote administration of the user's computer, during which the user may also take part in the control of this application, and monitor its working. The application Backdoor.Win32.Agent may also be intended for remote administration of the user's computer, but unlike RemoteAdmin, it may do so without the permission of the user, secretly, not revealing itself through demonstration of interface elements and not receiving data from peripheral data input device s 101.

During the working of the application RemoteAdmin, the activity analysis module 100 may intercept the events:

the transfer of data from the computer mouse 101 to the RemoteAdmin application when the user may set up the working of the application;

the calling of functions related to establishing a network connection with a server, such as socket, send, recv and so forth;

the calling of functions related to the sending of messages to applications working in the computer system 102, such as SendMessage, SendDlgItemMessage and so forth;

the receiving of data from the server through a local area computer network 103.

For all intercepted events, the parameters of the events may be singled out:

the coordinates of the cursor and the identifiers of the keys pressed on the computer mouse 101;

the network address of the server with which a connection may be established;

the volume of data being received from the server;

the types of messages being sent to other applications, such as:

the identifiers of applications;

the identifiers of messages; and the data being sent to applications in the context of messages.

After the parameters of the events have been singled out, the pattern identification module 110 may identify, from the events of the application RemoteAdmin previously intercepted, the events of data transfer in the computer network 103, and the events of data transfer from peripheral data input device s 101. These events of sending and receiving of data from the server with which the network connection may be previously established and the event of transfer of data from the computer mouse 101 to the RemoteAdmin application when the user may be setting up the working of that application.

The pattern identification module 110 may then determine from the remaining intercepted events the events which may be dependent on the previously identified events. This proves to be the event of calling the function SendMessage for the sending of data received from the server to applications working in the computer system 102. This type of message transmitted to applications may depend on the settings of the RemoteAdmin application, e.g., on the actions of the user performed with the computer mouse, and the data sent to the applications may be dependent on the data received from the server through the computer network 103. The dependency of the parameters of the determined event on the previously identified events may be represented in the form:

$$\begin{cases} T = k_1 \times M + k_2 \times D \\ P = k_3 \times M + k_4 \times D \end{cases}$$

where
- T—is the type of message being sent by the application RemoteAdmin to other applications installed in the computer system 102,
- P—is the volume of data being sent by the application RemoteAdmin to other applications installed in the computer system 102,
- M—are the parameters of the movement of the computer mouse 101,
- D—is the volume of data received by the application RemoteAdmin from the server through the computer network 103,
- {k}—is the set of coefficients.

Based at least on the dependencies obtained for the event of calling the function SendMessage for the transmission of data received from the server to the applications, a rule may be formulated which defines the above determined dependency, e.g., the numerical values of the coefficients may be calculated $k_1=0.85$, $k_2=0.19$, $k_3=0.21$, $k_4=0.47$
for the above-described dependency $$\begin{cases} T = k_1 \times M + k_2 \times D \\ P = k_3 \times M + k_4 \times D \end{cases}.$$

The search module 120 may determine and select from the library of rules 121 of the rules describing the dependency of these same parameters as the previously formulated rule, e.g., the type of message being sent to the applications installed in the computer system 102 and the volume of data being sent by the mentioned application with the help of the messages. Two of these may be determined and their coefficients may be respectively equal to:

$k_{11}=0.71$, $k_{12}=0.19$, $k_{13}=0.31$, $k_{14}=0.97$
$k_{21}=0.85$, $k_{22}=0.65$, $k_{23}=0.01$, $k_{24}=0.47$

After the rules have been selected, the search module 120 may determine the coefficient of similarity of the formulated rule and the selected rules:

$w_1=1.1606$. $w_2=1.069$,
and the total coefficient of similarity, being the averaged value of the above determined coefficients of similarity of the formulated rule and the selected rules, is:

$w_{total}=1.1148$,

Given the established threshold value of $w_{threshold}=1.5$, the obtained degree of similarity $w_{total}=1.1148$, may indicate that the intercepted events may not be classified as events of a computer system being remotely administered, and consequently the application RemoteAdmin may be legitimate.

During the working of the application Backdoor.Win32.Agent, the activity analysis module 100 may intercept the events:
- the calling of functions relating to the establishing of a network connection with a server, such as socket, send, recv and so on;
- the calling of functions related to the sending of messages to applications working in the computer system 102, such as SendMessage, SendDlgItemMessage and so on;
- the calling of functions relating to the receiving of data from a memory domain occupied by other applications installed in the computer system 102, such as OpenProcess, ReadProcessMemory,
- the receiving of data from a server through a computer network 103,
- the sending of data to a server through a computer network 103.

For all intercepted events, the parameters of the events may be singled out:
- the network address of the server with which a connection may be established;
- the volume of data being received from the server;
- the volume of data being sent to the server
- the types of messages being sent to other applications, such as:
  - the identifiers of applications;
  - the identifiers of messages; and
  - the data being sent to applications in the context of messages.
- the identifiers of applications occupying the memory regions from which reading of data may occur;
- the parameters of the memory region from which reading of data may occur.

After the parameters of the events have been determined, the pattern identification module 110 may identify, from the events of the application Backdoor.Win32Agent previously intercepted, the events of data transfer in the computer network 103, and the events of data transfer from peripheral data input devices 101. For example, these may include events of sending and receiving of data from the server with which the network connection was previously established, yet not one event of sending of data from the peripheral data input devices 101 may be identified. In particular, the events may be related to each other, in a case when one event may follow another not later than a previously established time threshold. Events may also be dependent, if the parameters of a later event may be correlated with the parameters of an earlier event, even in the case when a time may pass between the events which may be greater than a previously established time threshold.

The pattern identification module 110 may further determine, from the remaining intercepted events, the events which are dependent on the identified events based at least on criteria (such as temporal criteria, when event #2 occurs not later than a specified time after event #1 occurred):

1) events of the calling of the function SendMessage for the sending of data received from the server to applications running in the computer system 102. For the described example, the type of event being transmitted to the applications may depend on the volume of data received by Backdoor.Win32Agent from the server through the computer network 103. Each event may be characterized by its own, often individual volume of data being transmitted through the computer network, i.e., a dependency of the type T~D always occurs. Thus, the dependency of the parameters of the determined event on the previously identified events may be represented in linear form:

$$T = k_1 \times D + k_2$$

where
- T—is the type of message being sent by the application Backdoor.Win32Agent to the other applications installed in the computer system 102,
- D—is the volume of data received by the application Backdoor.Win32Agent from the server through the computer network 103,
- {k}—is the set of coefficients.

Based on the dependencies obtained for the event of calling the function SendMessage for the transmission of data received from the server to the applications, a rule may be formulated which may define the above determined dependency, e.g., the numerical values of the coefficients may be calculated $k_1 = 0.97$, $k_2 = 0.89$ for the above described dependency $$T = k_1 \times D + k_2.$$

2) the event of reading data from the memory region occupied by an application installed in the computer system 102 (by means of calling the function ReadProcessMemory). According to an aspect, the volume of data being read may depend on the memory address received by Backdoor.Win32Agent from the server in the computer network 103. For example, the dependency of the parameters of the determined event on the previously identified events may be presented in the form:

$$D = e^{k_5 \times A} \times k_2 k_3$$

where
- D—is the volume of data read at memory address A,
- A—is the memory address at which the data obtained by Backdoor.Win32Agent from the server in the computer network 103 is being stored,
- {k}—is the set of coefficients.

Based at least on the dependencies obtained for the event of calling the function ReadProcessMemory, a rule may be formulated which may define the above determined dependency, e.g., the numerical values of the coefficients may be calculated $k_1 = 0.47$, $k_2 = 0.98$, $k_3 = 1.43$ for the above described dependency $$D = e^{k_5 \times A} \times k_2 k_3$$

The search module 120 may determine and select from the library of rules 121 of the rules describing the dependency of these same parameters as the previously formulated rule. For example, coefficients may be respectively equal to:

$k_1 = 0.99$, $k_2 = 0.87$,
$k_1 = 0.53$, $k_2 = 0.98$, $k_3 = 1.21$,

After the rules have been selected, the search module 120 may determine the coefficient of similarity of the formulated rules and the selected rule:

$w_1 = 1.7346$, $w_2 = 2.9398$ and the total coefficient of similarity, being the averaged value of the above determined coefficients of similarity of the formulated rule and the selected rules, is:

$w_{total} = 2.3372$,

Given the established threshold value of $w_{threshold} = 1.5$, the obtained degree of similarity $w_{total} = 2.3372$, may indicate that the intercepted events may be classified as events of a computer system being administered remotely.

It should be understood that the above given formulas are merely examples, particular cases of implementation, and that any given formula empirically describing the obtained parameters of the intercepted events may be used to calculate the coefficients of similarity of the rules.

Thereafter, the analysis module 130 may perform an analysis of the structure of the application, determining executable code which may be responsible for:
- transmission or reception of data in the computer network 103,
- performance of actions in the computer system 102;

yet not related to:
- receiving of data from peripheral data input devices 101.

The search for the executable code of the application with the required functionality may be done as follows:

1. the segment of code being analyzed of the application may be disassembled, e.g., it is translated from machine code into a set of commands (for example, in the programming language Assembler);
2. in the resulting set of commands, a search may be performed for commands responsible for the required functionality, for example, the sending of data to the computer network may be done by means of a calling of the API function send and so forth;
3. the parameters being transmitted to the commands may be determined and analyzed;
4. if the parameters meet the established conditions, for example, the sending of data to a given server, it may be considered that the analyzed segment of code may be responsible for the required functionality.

Such a code may be identified, and its pseudocode may appear as

```
recv(<server>, <command>)
switch(<command>)
    case 'kill app': <closes the application running in the computer
    system 102>
    case 'send passwords': <sends passwords discovered on the computer
    system 102 through the computer network 103>
```

Such an organization of the working of an application may be characteristic of remote administration applications which may exchange data with servers in a computer network 103, perform actions in a computer system 102, yet do not in any way process data being received from peripheral data input devices 101.

Thus, the application Backdoor.Win32Agent may be determined to be a remote administration application and may be removed from the computer system 102.

Figure 2:
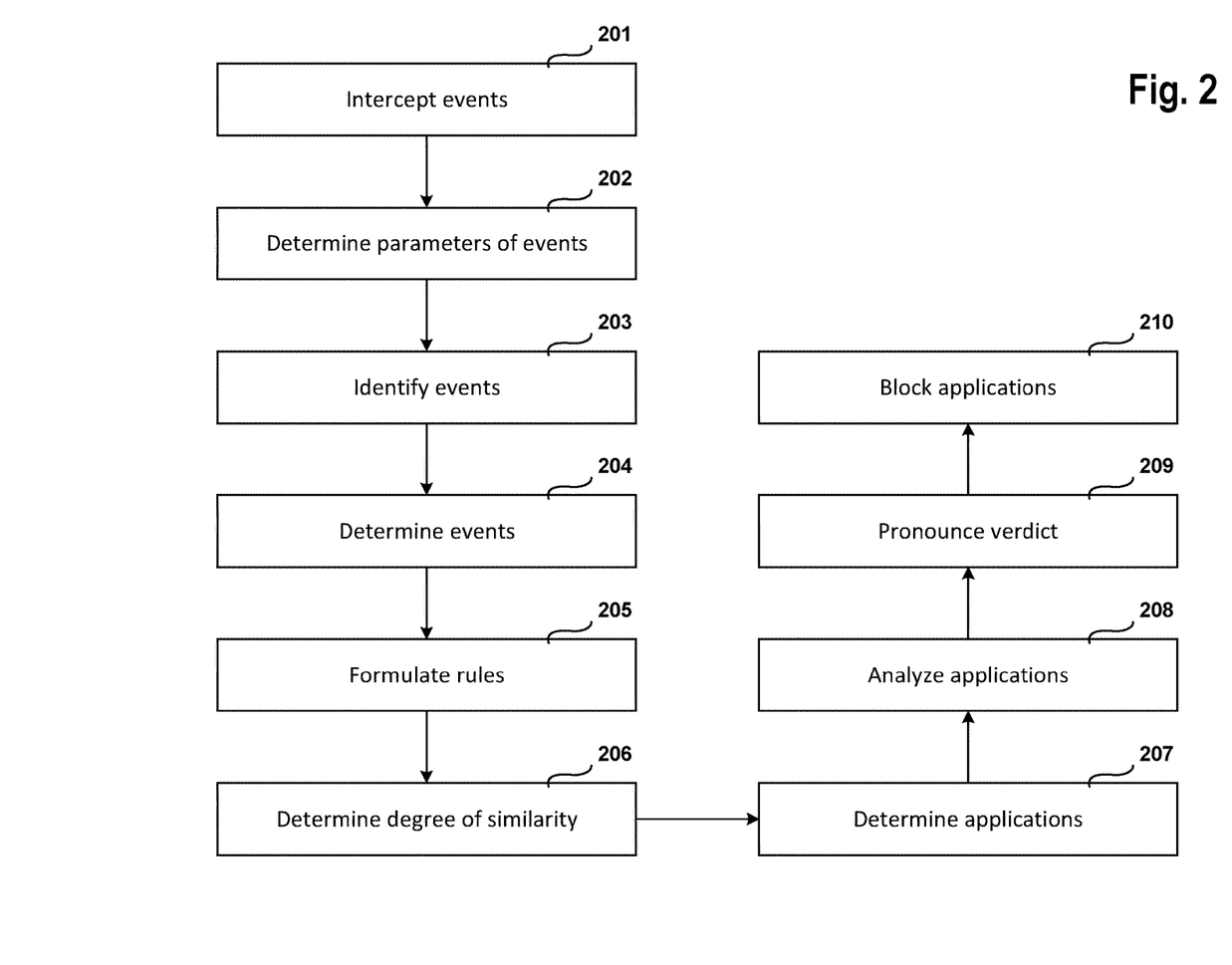
FIG. 2 presents a flow chart of an exemplary method for protecting computers from unauthorized remote administration.

FIG. 2 presents an exemplary method for protecting computers from unauthorized remote administration. The method begins with a step 201, in which events may be intercepted, step 202, in which the parameters of the events may be determined, step 203, in which events may be identified, step 204, in which events may be determined, step 205, in which rules may be formulated, step 206, in which the degree of similarity may be determined, step 207, in which applications may be determined, step 208, in which applications may be analyzed, step 209, in which a verdict may be pronounced, and step 210, in which applications may be blocked.

In step 201, the events which have occurred in the computer system 102 may be intercepted, where the intercepted events may include at least one of the following:

a call by applications for API functions of the operating system;

a transfer of data between processes of applications with the use of the Inter-Process Communication technology;

a transfer of data between software and hardware components of the computer system;

a transfer of data by applications in the computer network 103;

a transfer of data to applications from the peripheral data input devices 101.

The intercepting of events is done with the help of a driver installed in the computer system 102.

The peripheral data input device 101 may include at least one of the following:

a keyboard;

a computer mouse;

a touchscreen; and a contactless touchscreen controller.

In step 202, the parameters of each event intercepted in step 201 may be determined.

The event parameters may include at least one of the following:

the type of event;

the identifier of the application or process which created the event (Process Identifier, PID) in the operating system, the identifier of the application or service which created the event (Globally Unique Identifier, GUID) in the operating system;

the event preceding the mentioned event; and for the data being transferred:

the unique identifiers of the source of the data transmission and the source of the data reception, which may include at least one of:

the network address of the server taking part in the data transmission in the computer network 103, and the type of hardware component of the computer system 102, the type of data being transferred;

the volume of data being transferred;

the data being directly transferred.

In step 203, among the events intercepted in step 201, there may include identified events of transfer of data by an application in the computer network 103 and events of data transfer to an application from a peripheral data input device 101, based at least on an analysis of the parameters determined in step 202 of the events intercepted in step 201.

The identifying of the event among the intercepted events may occur based at least on at least one of:

the type of event; and the unique identifier of the application or the process of the application which created the event.

In step 204, among the events intercepted in step 201, at least one event dependent on the events identified in step 203 may be determined, the dependence of the intercepted event on the identified event being determined at least by:

the time elapsed between the registering of the identified event and the subsequent registering of the intercepted event may be less than a previously established time threshold, or the parameters of the intercepted event correlate with the parameters of the identified event registered earlier than the mentioned intercepted event.

In step 205, a rule may be determined and formed for at least one event determined in step 204 which may define the dependency of the parameters of the event determined in step 204 on the parameters of the events identified in step 203.

The rule defining the dependency of the parameters of one event on the parameters of another event may comprise at least:

the rectangular transform matrix $T=(t_{i,j})_{i=1,j=1}^{m,n}$, such that $$P_2 = X \times P_1,$$

where $P_1 = (p_i)_{i=1}^{m}$—is the set of parameters of event #1

$P_2 = (p_j)_{j=1}^{n}$—is the set of parameters of event #2 the set of coefficients $\{a_i\}$ of the function $P_2 = f(a_1, a_2, \ldots, a_n, P_1)$, where $P_1$—are the parameters of event #1, $P_2$—are the parameters of event #2.

The formulation of the rule defining the dependency of the parameters of one event on the parameters of another event may comprise:

selecting at least one of the ways of representing the rule being formulated:

in matrix form, where the dependency of one parameter on another may be expressed through operations with a matrix, in vector form, where the dependency of one parameter on another may be expressed through operations with a set of coefficients;

calculating the coefficients to be used for the selected representation of the rule for the specified parameters of the events.

In step 206, the degree of similarity of the rule formulated in step 205 with at least one previously created rule may be determined based at least on a comparison of the mentioned rules, wherein the previously created rule may define the dependency of the parameters of events occurring in the computer system 102 during the remote administration.

The previously created rules may be selected from the library of rules 121 based at least on coefficients of the rule obtained from the pattern identification module 110.

The previously created rules may be created in the same way as the rule formulated by the pattern identification module 110, namely:

a) various events may be intercepted in a computer system in which a known remote administration application was previously installed;

b) the parameters of the events may be determined for the intercepted events;

c) based at least on an analysis of the parameters as determined in the previous step for the events intercepted in step a), events of data transfer by the mentioned remote administration application in the computer network and events of data transfer to the mentioned remote administration application from a peripheral data input device may be identified among the mentioned events;

d) among the events intercepted in step a), at least one event may be determined which may be dependent on the events identified in the previous step;

e) a rule may be determined and created for at least one event determined in the previous step which may define the dependency of the parameters of the event determined in the previous step on the parameters of the events identified in step c);

The comparison of the rules may comprise at least one of the following:

the determination of the convolution of functions describing the rules being compared:

$$g = f_1 * f_2,$$

where
$f_1$—is a function mathematically expressing rule #1,
$f_2$—is a function mathematically expressing rule #2;
since a rule may include a predetermined relation between input and output data, where the predetermination (determinativeness) may indicate that the relation is unambiguously defined, e.g., no ambiguity or indeterminativeness is allowed, therefore the rule may be mathematically expressed by a certain function $f$ relating the input and output data of the rule;
the determination of the convolution of sequences comprising a set of elements of matrices defining the rules being compared:

$$g = \{a_k\} * \{b_l\},$$

where
$\{a_k\}$—is the set of elements of the matrix $A = (a_{i,j})_{i=1, j=1}^{m,n}$, mathematically expressing rule #1,
$\{b_l\}$—is the set of elements of the matrix $B = (b_{i,j})_{i=1, j=1}^{m,n}$, mathematically expressing rule #2;
since a rule may include a predetermined relation between input and output data, therefore the rule may be mathematically expressed by a certain matrix A transforming input data into output data of the rule;
The degree of similarity may include a number determined at least as:
the scalar product of two vectors, where each vector is a set of coefficients of the rules being compared; or
the value of the parameters of the previously determined convolution.

In step 207, when the degree of similarity as determined in step 206 exceeds the established threshold value, at least one application may be determined which created the event intercepted in step 201, whose parameters as determined in step 202 were used in step 205 to form the rule, whose degree of similarity, as determined in the previous step, to at least one previously created rule may be higher than the established threshold value.

In step 208, the application determined in step 207 may be analyzed, where the dependency of the parameters of the event of the data transfer by the mentioned application in the computer network 103 on the parameters of the event of the data transfer from the peripheral data input device 101 may be determined during the analysis.

The analysis of the application may comprise at least:
a heuristic analysis of the application, during which one may determine:
which data is transferred from the peripheral data input device 101;
which actions may occur after the data transfer in the computer system 102,
which data after this is transmitted or received in the computer network 103,
the dependency between the determined data and actions;
an analysis of the structure of the application and the code responsible for:
transfer of data in the computer network 103,
performance of actions in the computer system 102, and
transmission or reception of data in the computer network 103.

In step 209, a verdict may be pronounced on the detecting of a remote administration application based at least on the determination of the existence of a dependency during the analysis performed in step 208.

In step 210, the application determined in step 207 may be blocked based on the results of the verdict pronounced in step 209 as to the detecting of a remote administration application.

The blocking of the application may comprise at least at least one of the following:
blocking the exchange of data in the computer network with the involvement of the application;
removal of the application from the RAM; and
removal of the application from information media (such as hard drives and the like) which make up the computer system 102.

Figure 3:
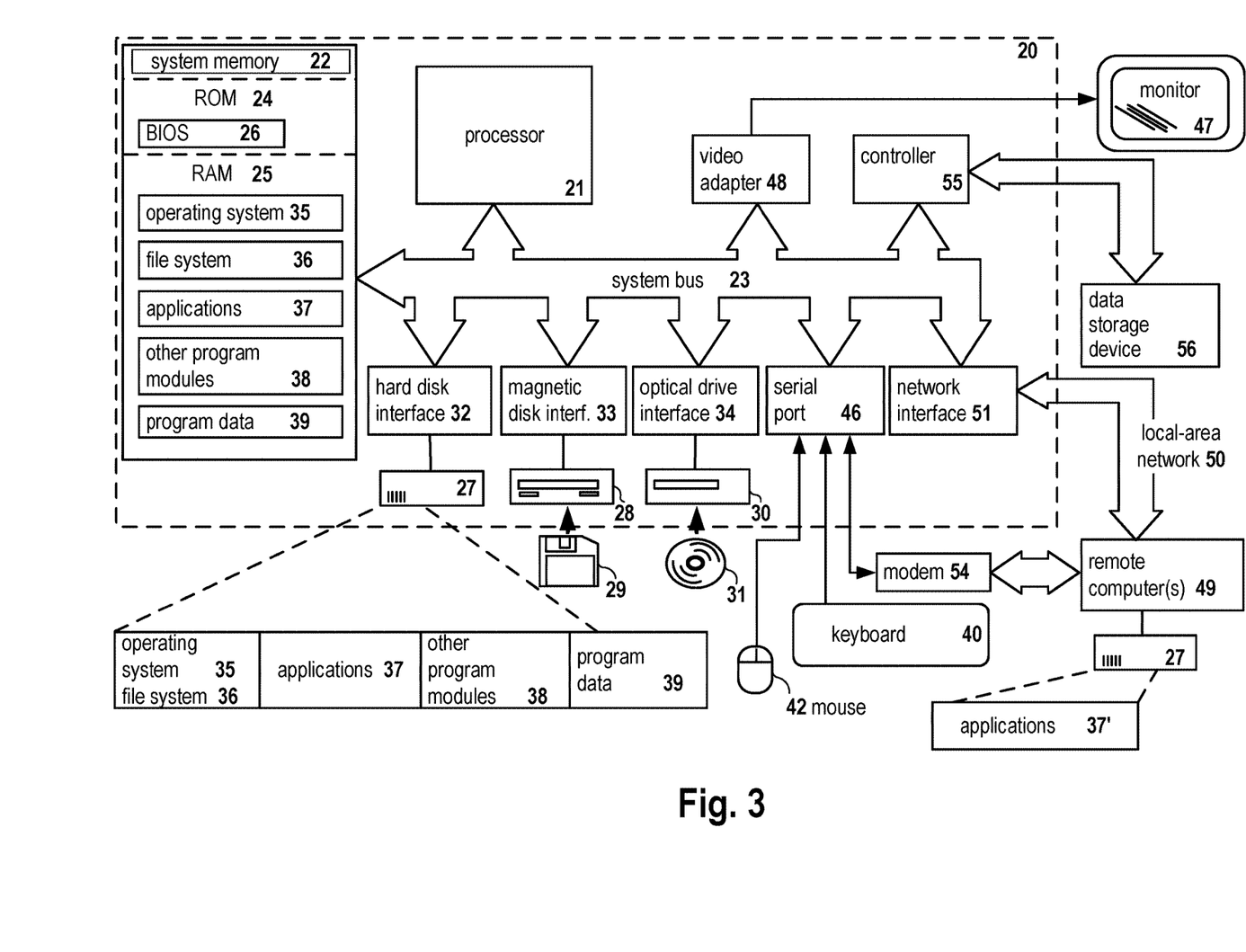
FIG. 3 presents an example general-purpose computer system, such as a personal computer or server, on which systems and methods disclosed herein may be implemented.

FIG. 3 illustrates an example of a computer system or computing device on which the disclosed systems and method may be implemented. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a user computer or computing device (such as activity analysis module 100, pattern identification module 110, search module 120, and analysis module 130 described in greater detail in FIGS. 1 and 2 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method of detecting a remote administration of a computer system, the method comprising:
    intercepting a plurality of events occurring in the computer system including a first event and a second event associated with data transfer with an application executing in the computer system;
    determining that the first intercepted event is dependent on the second intercepted event based on parameters of the first intercepted event and the second intercepted event, wherein the parameters include a time elapsed between the interception of the first event and the interception of the second event and a pre-determined time threshold;
    generating a rule defining a dependency of at least one parameter of the first intercepted event on at least one parameter of the second intercepted event;
    responsive to determining a degree of similarity of the generated rule and a previously created rule exceeds a threshold value, identifying at least one application as a remote administration application that created the first and second identified intercepted events; and
    blocking the identified remote administration application from exchanging data with the computer system.

2. The method of claim 1, further comprises:
    determining respective parameters of each of the plurality of intercepted events; and
    identifying, based at least on the determined parameters, each intercepted event as being relating to a first data transfer by an application in a computer network or a second data transfer to the application from a peripheral data input device of the computer system.

3. The method of claim 1, wherein determining the degree of similarity of the generated rule and a previously created rule further comprises:
    comparing the generated rule to the previously created rule that defines one or more dependencies of parameters of events occurring in the computer system during the remote administration.

4. The method of claim 1, wherein the rule defining the dependency specifies a rectangular transform matrix as a function of a set of parameters of the first event and a set of parameters of the second event.

5. The method of claim 1, wherein the generated rule is formulated in matrix form, wherein the dependency of the at least one parameter of the first event on the at least one parameter of the second event is expressed through operations with a matrix.

6. The method of claim 1, wherein the generated rule is formulated in vector form, wherein the dependency of the at least one parameter of the first event on the at least one parameter of the second event is expressed through operations with a set of coefficients.

7. A system for detecting a remote administration of a computer system, the system comprising:
a hardware processor configured to:
intercept a plurality of events occurring in the computer system including a first event and a second event associated with data transfer with an application executing in the computer system;
determine that the first intercepted event is dependent on the second intercepted event based on parameters of the first intercepted event and the second intercepted event, wherein the parameters include a time elapsed between the interception of the first event and the interception of the second event and a pre-determined time threshold;
generate a rule defining a dependency of at least one parameter of the first intercepted event on at least one parameter of the second intercepted event;
responsive to determining a degree of similarity of the generated rule and a previously created rule exceeds a threshold value, identify at least one application as a remote administration application that created the first and second identified intercepted events; and
block the identified remote administration application from exchanging data with the computer system.

8. The system of claim 7, wherein the processor is further configured to:
determine respective parameters of each of the plurality of intercepted events; and
identify, based at least on the determined parameters, each intercepted event as being relating to a first data transfer by an application in a computer network or a second data transfer to the application from a peripheral data input device of the computer system.

9. The system of claim 7, wherein the processor configured to determine the degree of similarity of the generated rule and a previously created rule is further configured to:
compare the generated rule to the previously created rule that defines one or more dependencies of parameters of events occurring in the computer system during the remote administration.

10. The system of claim 7, wherein the rule defining the dependency specifies a rectangular transform matrix as a function of a set of parameters of the first event and a set of parameters of the second event.

11. The system of claim 7, wherein the generated rule is formulated in matrix form, wherein the dependency of the at least one parameter of the first event on the at least one parameter of the second event is expressed through operations with a matrix.

12. The system of claim 7, wherein the generated rule is formulated in vector form, wherein the dependency of the at least one parameter of the first event on the at least one parameter of the second event is expressed through operations with a set of coefficients.

13. A non-transitory computer readable medium comprising computer executable instructions for detecting a remote administration of a computer system, including instructions for:
intercepting a plurality of events occurring in the computer system including a first event and a second event associated with data transfer with an application executing in the computer system;
determining that the first intercepted event is dependent on the second intercepted event based on parameters of the first intercepted event and the second intercepted event, wherein the parameters include a time elapsed between the interception of the first event and the interception of the second event and a pre-determined time threshold;
generating a rule defining a dependency of at least one parameter of the first intercepted event on at least one parameter of the second intercepted event;
responsive to determining a degree of similarity of the generated rule and a previously created rule exceeds a threshold value, identifying at least one application as a remote administration application that created the first and second identified intercepted events; and
blocking the identified remote administration application from exchanging data with the computer system.

14. The computer-readable storage medium of claim 13, further comprising instructions for:
determining respective parameters of each of the plurality of intercepted events; and
identifying, based at least on the determined parameters, each intercepted event as being relating to a first data transfer by an application in a computer network or a second data transfer to the application from a peripheral data input device of the computer system.

15. The computer-readable storage medium of claim 13, wherein the instructions for determining the degree of similarity of the generated rule and a previously created rule further comprises instructions for:
comparing the generated rule to the previously created rule that defines one or more dependencies of parameters of events occurring in the computer system during the remote administration.

16. The computer-readable storage medium of claim 13, wherein the rule defining the dependency specifies a rectangular transform matrix as a function of a set of parameters of the first event and a set of parameters of the second event.

17. The computer-readable storage medium of claim 13, wherein the generated rule is formulated in matrix form, wherein the dependency of the at least one parameter of the first event on the at least one parameter of the second event is expressed through operations with a matrix.

18. The computer-readable storage medium of claim 13, wherein the generated rule is formulated in vector form, wherein the dependency of the at least one parameter of the first event on the at least one parameter of the second event is expressed through operations with a set of coefficients.

* * * * *